US008250201B2

(12) United States Patent
Hunt et al.

(10) Patent No.: US 8,250,201 B2
(45) Date of Patent: Aug. 21, 2012

(54) SERVLET MONITORING TOOL

(75) Inventors: William L. Hunt, Fort Collins, CO (US); John W. Lamb, Jr., Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 2058 days.

(21) Appl. No.: 10/237,310

(22) Filed: Sep. 9, 2002

(65) Prior Publication Data

US 2004/0073653 A1 Apr. 15, 2004

(51) Int. Cl.
*G06F 15/173* (2006.01)
(52) U.S. Cl. ......... 709/224; 709/201; 709/202; 709/203
(58) Field of Classification Search .................. 709/203, 709/224, 201, 202
See application file for complete search history.

(56) References Cited

U.S. PATENT DOCUMENTS

| | | | |
|---|---|---|---|
| 6,098,093 A | 8/2000 | Bayeh et al. ............... 709/203 |
| 6,105,067 A | 8/2000 | Batra ........................... 709/227 |
| 6,223,202 B1 | 4/2001 | Bayeh ......................... 709/102 |
| 6,546,548 B1* | 4/2003 | Berry et al. .................. 717/128 |
| 6,639,687 B1* | 10/2003 | Neilsen ......................... 358/1.14 |
| 6,701,363 B1* | 3/2004 | Chiu et al. .................... 709/224 |
| 6,857,119 B1* | 2/2005 | Desai ........................... 717/145 |
| 6,904,594 B1* | 6/2005 | Berry et al. .................. 718/100 |
| 2001/0024165 A1 | 9/2001 | Steen et al. ............ 340/870.01 |
| 2002/0116479 A1* | 8/2002 | Ishida et al. ................. 709/220 |
| 2002/0129137 A1* | 9/2002 | Mills et al. ................... 709/224 |
| 2002/0184363 A1* | 12/2002 | Viavant et al. ............... 709/224 |
| 2003/0061342 A1* | 3/2003 | Abdelhadi et al. ............ 709/224 |
| 2003/0065986 A1* | 4/2003 | Fraenkel et al. ................ 714/47 |
| 2003/0084120 A1* | 5/2003 | Egli .............................. 709/218 |
| 2003/0088644 A1* | 5/2003 | Ganguly et al. .............. 709/218 |
| 2003/0093460 A1* | 5/2003 | Kinney et al. ................ 709/202 |
| 2003/0158918 A1* | 8/2003 | Hanis ............................ 709/220 |
| 2004/0205570 A1* | 10/2004 | Tonomura .................... 715/513 |
| 2010/0077073 A1* | 3/2010 | Haenel et al. ................ 709/224 |

FOREIGN PATENT DOCUMENTS

| CA | 2255023 | 11/1998 |
|---|---|---|
| JP | 2000029814 A | 8/2000 |
| JP | 200201648 A | 1/2002 |

OTHER PUBLICATIONS

2)The Automator: Intelligent Control System Monitoring, by: M. Bickley, D.A. Bryan, K. S. White, Thomas Jefferson National Accelerator Facility, Newport News, VA pp. 735-737 0-7803-5573-3/99 1999 IEEE.
3)The Web-Based Fuzzy Pateint Monitor System by: J. W. Shin, D.Y. Cha, K. J. Lee & Y. R. Yoon 0-7803-6465-1/00 2000 IEEE pp. 1265-1266. 4)Research Disclosure Feb. 2001 p. 322 E-Business Application Monitoring Tool Intuitive Systems' Optimizeit 4.0 Helps Take the Kinks Out of Java Apps. L. MacVittie, Network Computing vol. 11, No. 22 pp. 40, 42, Nov. 13, 2000.

* cited by examiner

*Primary Examiner* — Lan-Dai T Truong
(74) *Attorney, Agent, or Firm* — John Pivnichny

(57) ABSTRACT

Server performance is monitored by inserting code into servlets running on the server. Code is inserted at the servlet beginning to record start time, servlet name and input parameters in a table in memory on the server. Code is also inserted at the exit and exception points of the servlet to record stop time in the table and to determine whether to add this information in the table to an array in a web page a log file. The web page or log file is then examined to determine server performance.

7 Claims, 3 Drawing Sheets

SERVLET MONITORING TOOL

TECHNICAL FIELD

The invention relates in general to methods and systems for monitoring server performance from a client. In particular the invention relates to capturing data concerning the internal aspects of each executed servlet.

BACKGROUND OF THE INVENTION

When using the Internet, a client may communicate with a server using different protocols such as the Hypertext Transfer Protocol (HTTP) of the World Wide Web (WWW). This protocol uses Uniform Resource Locators (URL's) to reference files, directories, or complex tasks on the Internet. A complex task may include execution by a web server of a servlet.

An HTTP request may be sent by a client browser to a server over the WWW using the HTTP protocol. Upon receipt of the request, the client will assign it to be processed appropriately by servlets. The servlets perform their complex tasks and return data to the client browser as a Hyper Text Markup Language (HTML) document. Other data formats compatible with the client browser such as Extensible Markup Language (XML) may also be used for the return data. The servlet therefore enhances functionality of web servers. Although primarily used with the HTTP protocol, servlets may also use other technologies.

Servlets are normally written in Java source code, then compiled and installed on a web server that supports servlets such as an Apache HTTP server of the Apache Software Foundation, Forest Hills, Md. or Sun Microsystems' Java Web Server.

Companies which provide web server capability need to monitor the performance such as response time and operational characteristics of their server(s) when running Java or other servlets. For example, current servers may be executing 1.5 million servlets weekly. Such monitoring is necessary to insure acceptable server capability is provided. Otherwise a human user of the web server capability will become dissatisfied and switch to a competitor's capability. Many support tools for monitoring have therefore been developed.

The article "e-business application monitoring tool," published in Research Disclosure journal of February 2001, page 322 describes checking for server presence using a ping/ping reply test. The article also describes checking for the existence of a process ID (PID) on the server to ensure an application (servlet) is up and running on a server.

The Research Disclosure article also describes a tool for testing application functionality on a server. An application monitoring tool simulates a web client. The tool is run using the timed URL execution capability (CRON) on a Unix platform machine. The monitoring tool sends a URL from a list to the server and tests the server's ability to return a standard HTML page. If the response is bad, or times out after a specified number of re-tries, the event is logged, otherwise the tool proceeds to the next URL on the list. Other responses may also be tested including the server's ability to invoke an Active Server Page (ASP), JAVA SERVER PAGES™ (JSP) (JAVA SERVER PAGES is a trademark of Sun Microsystems, Inc. Santa Clara, Calif.), servlet, or cgi-bin program.

In addition to monitoring, action must be taken when unacceptable performance or operational characteristics are detected. One possible action may be to start additional virtual machines (VMs) running on a server. Bayeh in U.S. Pat. No. 6,223,202 B1 describes a virtual machine pooling technique in which starting or stopping VMs is handled by a controller which monitors execution of the VMs.

Another technique for enhancing performance of computers in a web environment is described by Batra in U.S. Pat. No. 6,105,067. A pool of connections between a web server and backend data servers is created. A process is defined for assigning connections and maintaining connections after processing of a client request is completed. The connections are maintained in the pool. When another client request is received, a connection from the pool is used if one is available. This technique avoids the overhead of re-establishing a new connection.

Fraenkel et al. in Canadian patent application publication 2,255,023 describe monitoring the execution of hybrid source code on a server in order to assist an application developer to detect errors JSP code. A page compiler, while translating JSP code into a servlet includes support for execution tracing by an execution monitor. An application developer can therefore view a correlation between JSP code, servlet code, and the resulting HTML code generated by the servlet.

Despite the aforementioned and other developments in monitoring server performance, there remains a need for a technique to gather information on servlets in order to ascertain performance, perform problem determination, and improve central processing unit CPU utilization on web servers.

In accordance with the present invention, there is defined a new method, system, and program product for improved server performance monitoring. It is believed that such improved monitoring would constitute a significant advancement in the art.

OBJECTS AND SUMMARY OF THE INVENTION

It is therefore a principal object of the present invention to enhance the server performance monitoring art by providing a monitoring method with enhanced functional capabilities.

It is another object to provide a server monitoring method wherein enhanced operational capabilities are possible.

It is a further object to provide a system for performing server monitoring with such enhanced functional and operational capabilities.

It is yet another object of the invention to provide a program product embodying in program instruction means such enhanced methods.

These and other objects are attained in accordance with one embodiment of the invention wherein there is provided a method of monitoring server performance, comprising the steps of, providing one or more servlets on a server, inserting code at the beginning of each of the servlets to record, when executed, its start time in a table in memory on the server, inserting code at the exit or exception points of each of the servlets, to record its stop time in the table, and to check whether to add recorded servlet execution information to a servlets array in a web page, and sending the servlets array to an application.

In accordance with another embodiment of the invention there is provided a system for monitoring server performance, comprising, a server having a memory and one or more servlets, means for inserting code at the beginning of each of the servlets to record, when executed, its start time in a table in the memory, means for inserting code at the exit or exception points of each of the servlets, to record its stop time in the table, and to check whether to add recorded servlet execution information to a servlets array in a web page on the server, and means for sending the servlets array to a browser.

In yet another embodiment of the invention there is provided a computer program product for instructing a processor to monitor performance of a server having a memory and a plurality of servlets, the computer program product comprising, a computer readable medium, first program instruction means for inserting code at the beginning of each of the servlets to record, when executed, its start time in a table in the memory, second program instruction means for inserting code at the exit or exception points of each of the servlets, to record its stop time in the table, and to check whether to add recorded servlet execution information to a servlets array in a web page on the server, and third program instruction means for sending the servlets array to a browser, and wherein all the program instruction means are recorded on the medium.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
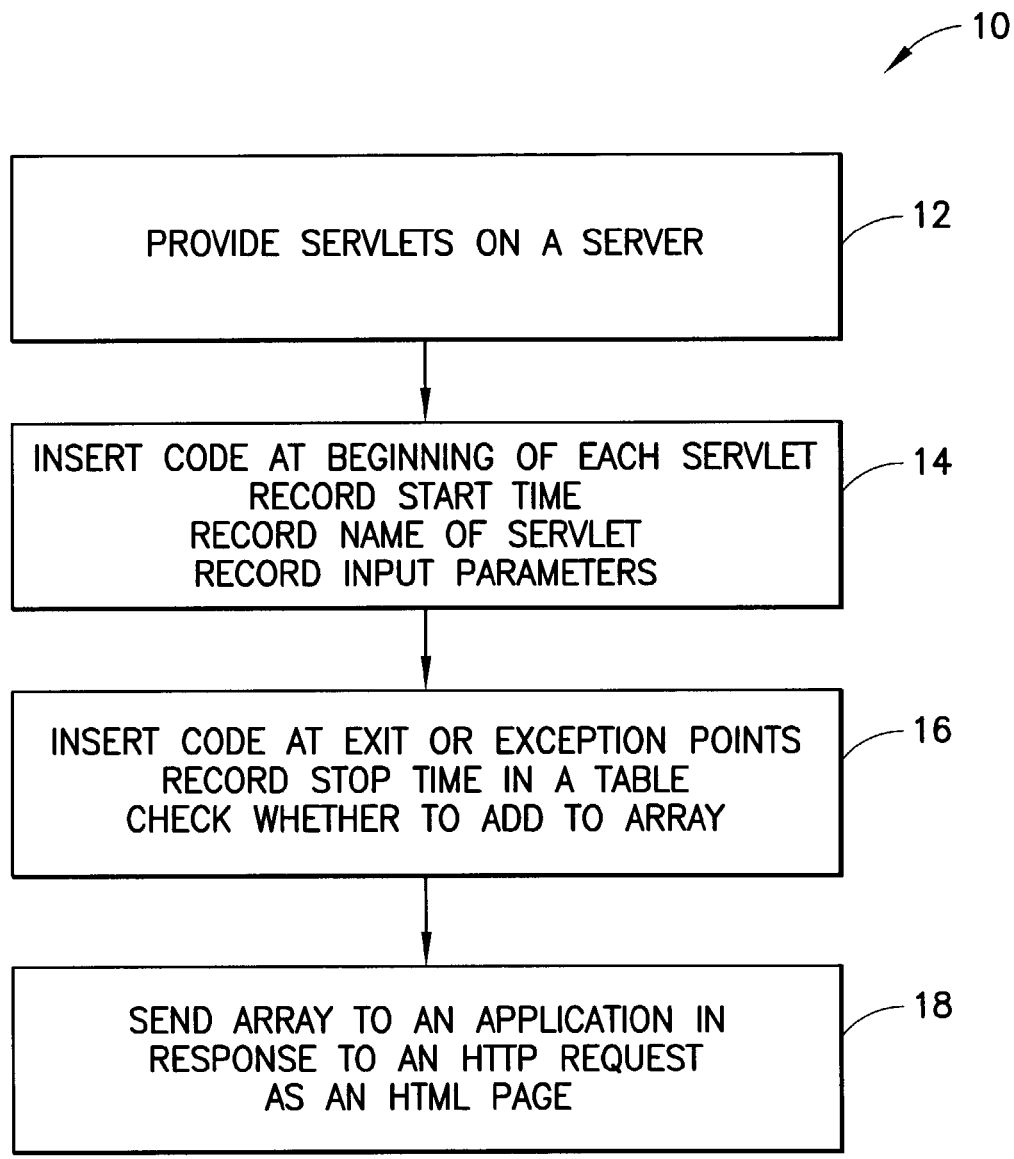
FIG. 1. is a flowchart of steps in accordance with one embodiment of the invention.

In FIG. 1 there is shown flowchart 10 depicting one method of monitoring server performance in accordance with the present invention. FIG. 1 will be explained in conjunction with FIG. 3 which depicts a system 30 for monitoring server performance in accordance with the present invention. Server 32 has memory 34 and one or more servlets 36 therein. Each servlet 36 comprises code which may be executed on server 32. Each servlet has a beginning 40 and an exit 44. There may also be one or more exception points 42 in servlet 36. Table 38 is also in memory 34. Servlets are provided in step 12 of FIG. 1. In step 14, code is inserted at beginning 40 of each servlet. The inserted code, when executed records the start time of the servlet in table 38 in memory 34. Table 38 may be a hashtable. Means for inserting the code may include a compiler such as a JAVA™ source code compiler (JAVA is a trademark of Sun Microsystems, Inc. Santa Clara, Calif.). Means for inserting code may also include enhancing the servlet execution environment. The code to be inserted is placed at the beginning of the servlet source code. The combined source code is then compiled and placed in memory 34 of server 32. Other means known in the art of inserting code in a servlet may also be used. The code inserted at the beginning of each servlet may also record other information in table 38 such as the name of the servlet and input parameters received by the servlet. The input parameters may be received as part of a POST or GET request from a browser.

The code inserted at the beginning of each servlet may also record the name of the servlet or application that it was invoked by in table 38.

In step 16, code is inserted at exit 44 or exception points 42 or both. The inserted code, when executed, records the servlet's stop time in table 38. The servlet total run time may also be computed using the previously recorded start time. The code inserted at exception points 42 may also record exception conditions in table 38.

The code inserted at exception points 42 and exit points 44 also checks whether to add the servlet execution information in table 38 to servlets array 48 for subsequent insertion in web page 46 which may be an HTML page having a URL on server 32. Servlets array 48 may also be presented in an HTML page or inserted in a log file. For example, if the total execution time exceeds a pre-specified minimum time, then the execution information in table 38 is added to array 48.

Figure 3:
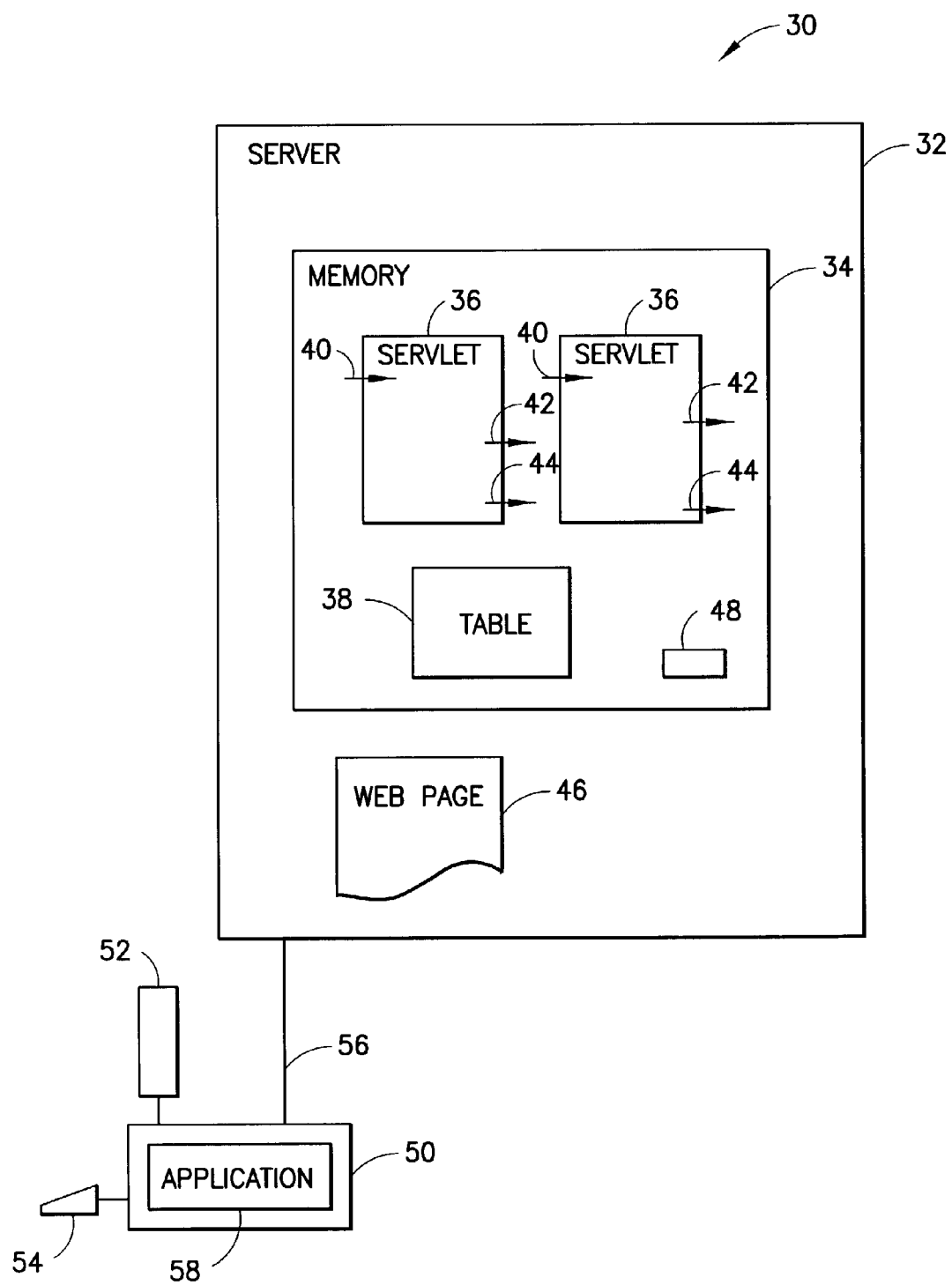
FIG. 3 is a block diagram of system components of another embodiment of the present invention.

In step 18, array 48 is sent to application 58, which may be a browser, of FIG. 3. Application 58 is running on client computer 50 which may be any type of computing device including, but not limited to, a laptop, desktop, workstation, palm device, advanced cell phone, mainframe, or any other type of computing device capable of receiving and interpreting HTML code such as running a browser. Client computer 50 may have an attached keyboard 54 or other input devices known in the art such as mouse, trackball or microphone and voice response capability. Display device 52 may also be attached or incorporated in client computer 50.

Client computer 50 is capable of communicating with server 32 via connection 56 which may be a LAN connection, WAN, wireless, infrared, optical fiber, dial up or any other type of communication connection.

Application 58 may request web page 46 having array 48 via an HTTP request over connection 56. Web page 46 is sent to application 58 over connection 56 where it is received and displayed on display device 52. Someone wishing to investigate server performance can therefore view array 48 in web page 46 at a remote workstation 50. This person may also perform further analysis on the displayed data. Some examples of further analysis include displaying the longest running servlets, or displaying all servlets. Further analysis may also be performed by displaying some or all input parameters recorded in steps 14, 24.

Figure 2:
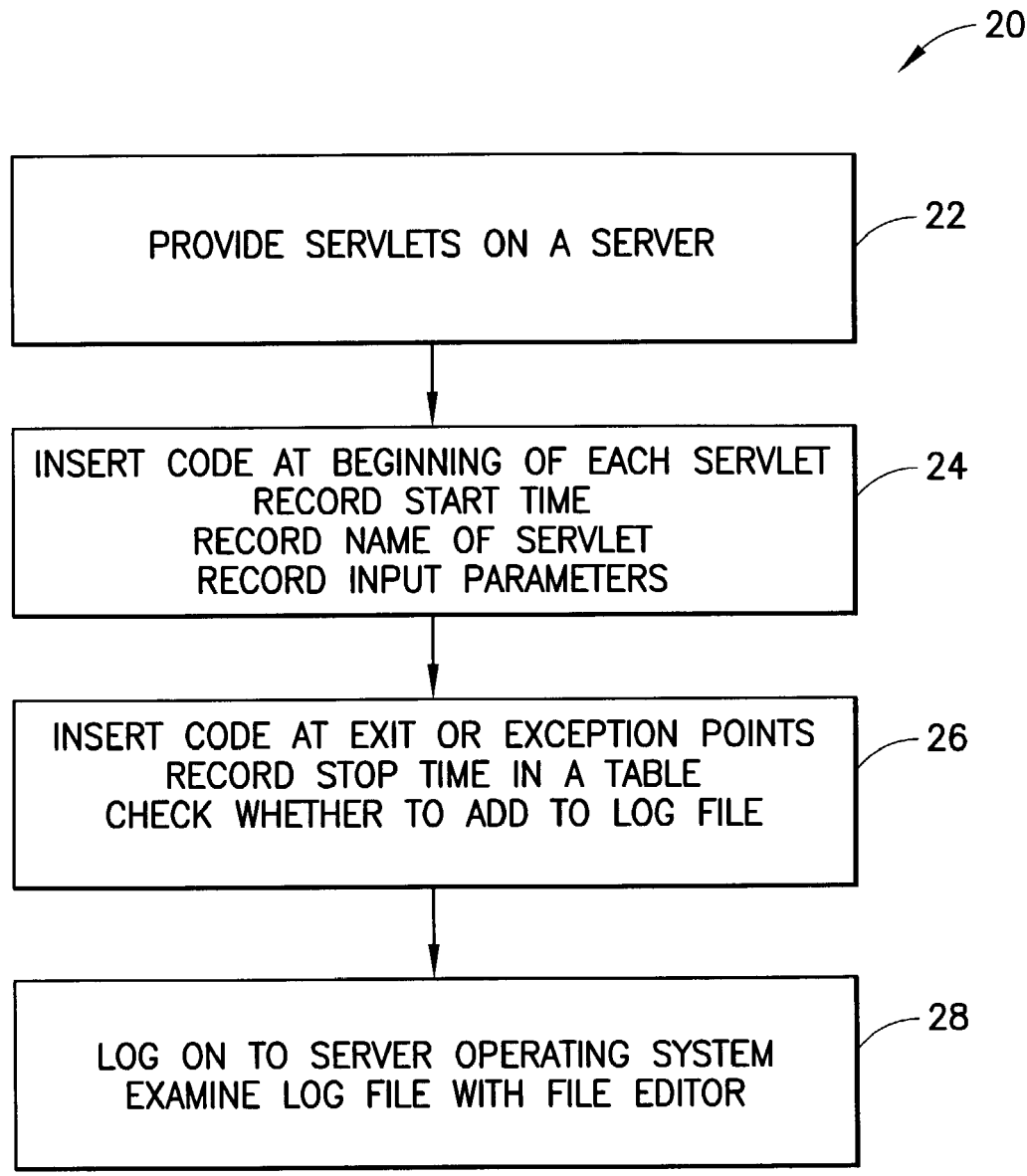
FIG. 2 is another flowchart depicting steps in accordance with another embodiment of the invention.

In FIG. 2 there is shown flowchart 20 of another alternative embodiment of the present invention. Steps 22 and 24 are identical to steps 12 and 14 of FIG. 1. In step 26, code is inserted at exit 44 and exception points 42 of each servlet to record its stop time in table 38, and to check whether to add the recorded servlet execution information to a log file (not shown) on server 32.

In step 28 a user logs on to an operating system on server 32. He use then examines the log file using file editor software. The user then examines the log file using file editor software. The user may log on remotely from client computer 50 of FIG. 3.

While there have been shown and described what are at present considered the preferred embodiments of the invention, it will be obvious to those skilled in the art that various modifications made be made therein without departing from the scope of the invention as defined by the appended claims.

What is claimed is:

1. A method of monitoring server performance, comprising the steps of:
providing one or more servlets on a server;
inserting code at beginning of each of said servlets to record, when executed, start time of said each of said servlets in a table in memory on said server;
inserting code at exit or exception points of each of said servlets, to record stop time of said each of said servlets in said table, and to check whether to add recorded servlet execution information to a servlets array in a web page;
inserting code at the beginning of each of said servlets to record, when executed, the name of said each of said servlets in said table in memory;

inserting code at the beginning of each of said servlets to record, when executed, servlet input parameters in said table in memory wherein said input parameters are received via a POST or GET request; and sending said servlets array to an application.

2. The method of claim 1, wherein said check determines whether said recorded servlet execution information exceeded a pre-specified minimum time.

3. The method of claim 1, wherein said servlets array is sent by a servlet in response to an HTTP request from said application.

4. The method of claim 3, wherein said servlets array is sent to said application as an HTML page.

5. A system for monitoring server performance, comprising:

a server having a memory and one or more servlets;

the server configured to:

insert code at beginning of each of said servlets to record, when executed, start time of said each of said servlets in a table in said memory;

insert code at exit or exception points of each of said servlets, to record stop time of said each of said servlets in said table, and to check whether to add recorded servlet execution information to a servlets array in a web page on said server;

insert code at the beginning of each of said servlets to record, when executed, the name of said each of said servlets in said table in memory;

insert code at the beginning of each of said servlets to record, when executed, servlet input parameters in said table in memory wherein said server is adapted to receive said input parameters via a POST or GET request; and a browser running on a client computer in communication with said server, said browser displaying said web page on a display device.

6. The system of claim 5, wherein said check determines whether said recorded servlet execution information exceeded a pre-specified minimum time.

7. The system of claim 5, wherein said servlets array comprises an HTML page.

\* \* \* \* \*